US012558629B2

(12) United States Patent
Lee et al.

(10) Patent No.: US 12,558,629 B2
(45) Date of Patent: Feb. 24, 2026

(54) FLEET CONTROLLER MANAGEMENT FOR A DYNAMIC GAMING ENVIRONMENT

(71) Applicant: Dell Products L.P., Round Rock, TX (US)

(72) Inventors: Hsu-Feng Lee, Taipei City (TW); Gerald Rene Pelissier, Mendham, NJ (US); Wei-Hsiang Chi, Taipei (TW)

(73) Assignee: Dell Products L.P., Round Rock, TX (US)

( * ) Notice: Subject to any disclaimer, the term of this patent is extended or adjusted under 35 U.S.C. 154(b) by 291 days.

(21) Appl. No.: 18/353,075

(22) Filed: Jul. 15, 2023

(65) Prior Publication Data

US 2025/0018306 A1      Jan. 16, 2025

(51) Int. Cl.
*A63F 13/77*         (2014.01)
*A63F 13/537*       (2014.01)

(52) U.S. Cl.
CPC ............ *A63F 13/77* (2014.09); *A63F 13/537* (2014.09)

(58) Field of Classification Search
CPC .... A63F 13/77; A63F 13/537; G07F 17/3239; G07F 17/3225
See application file for complete search history.

(56) References Cited

U.S. PATENT DOCUMENTS

| | | | |
|---|---|---|---|
| 2003/0027634 A1* | 2/2003 | Matthews, III ......... | A63F 13/79 463/39 |
| 2006/0035707 A1* | 2/2006 | Nguyen .............. | G07F 17/3218 463/29 |
| 2007/0190494 A1* | 8/2007 | Rosenberg .............. | A63F 13/79 463/40 |
| 2010/0178986 A1* | 7/2010 | Davis .................. | G07F 17/3223 463/42 |
| 2010/0211431 A1* | 8/2010 | Lutnick .............. | G06Q 30/0255 705/14.1 |
| 2013/0225282 A1* | 8/2013 | Williams ............ | G07F 17/3218 463/29 |
| 2013/0262203 A1* | 10/2013 | Frederick .......... | G06Q 30/0209 705/14.58 |
| 2015/0228153 A1* | 8/2015 | Hedrick ............ | G06Q 20/3223 463/31 |

* cited by examiner

*Primary Examiner* — Steve Rowland
(74) *Attorney, Agent, or Firm* — Norton Rose Fulbright US LLP

(57) ABSTRACT

Systems and methods described herein may provide a system that enables the monitoring and display of status information for a gaming controller, which may include battery status, location information, the availability of a gaming controller, or a user profile associated with the controller. The system may employ methods to associate a gaming controller with an information handling system (e.g., a mobile device) and with a gaming hub. The system may accommodate multiple gaming controllers and enable monitoring of status information for each of the gaming controllers.

17 Claims, 6 Drawing Sheets

500

Start

Associate an information handling system with a gaming hub —510

Receive status information regarding at least one gaming controller —520

Display the status information —530

FLEET CONTROLLER MANAGEMENT FOR A DYNAMIC GAMING ENVIRONMENT

FIELD OF THE DISCLOSURE

The instant disclosure relates to information handling systems. More specifically, portions of this disclosure relate to execution of applications in a multi-room user environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications. Users may interact with gaming applications using a gaming controller (e.g., a wireless controller). Users may desire to monitor the status information of a gaming controller, such as battery status, location information, the availability of a gaming controller, or a user profile associated with the gaming controller. Aspects of embodiments of this disclosure enable the monitoring and display of status information for a gaming controller. The system may employ methods to associate a gaming controller with an information handling system (e.g., a mobile device) and with a gaming hub.

The system may accommodate a fleet of multiple gaming controllers and enable monitoring of status information for each of the gaming controllers. For example, multiple users in a household (as an example of a dynamic gaming environment) may have gaming controllers. The gaming controllers may be associated with a gaming hub in the household, which allows a single mobile device, such as a phone of a parent in the household, to receive and monitor information regarding the fleet of gaming controllers, as well as perform management operations such as registration and deregistration of controllers with the gaming hub.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry. A user's mobile device may receive this telemetry information as part of the status of the gaming controllers. In some embodiments, rules may be applied to the telemetry data to perform predefined actions, such as the triggering of messaging alerts (e.g., text messages or push notifications) based on the telemetry data.

According to one embodiment, a method for execution by an information handling system (e.g., a mobile device), includes associating an information handling system with a gaming hub, receiving by the information handling system status information regarding at least one gaming controller, the status information including at least a user profile associated with the at least one gaming controller, a battery charge status, and a location, and displaying, by the information handling system, the status information.

In certain embodiments, a method may include registering, by the information handling system, the at least one gaming controller with the gaming hub; wherein after registering the at least one gaming controller, the status information includes a status of the at least one controller. In some implementations, the method may further include configuring, by the information handling system, a user profile for the at least one gaming controller and associating the user profile for the at least one gaming controller with the information handling system.

In some embodiments, the method may include receiving by the information handling system status information regarding a plurality of gaming controller, and registering, by the information handling system, each gaming controller of the plurality of gaming controllers with the gaming hub. In some such implementations, displaying, by the information handling system, the status information may include displaying status information for each gaming controller of the plurality of gaming controllers.

In some embodiments, receiving by the information handling system status information regarding at least one gaming controller further comprises receiving the status information from the gaming hub through a cloud server.

In some implementations, status information regarding a location of a gaming controller is determined based on a knowledge graph. The knowledge graph may correspond to environments in a household. In some embodiments, a method may include removing the at least one gaming controller from an environment in the household and maintaining a connection between the at least one gaming controller and the information handling system.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
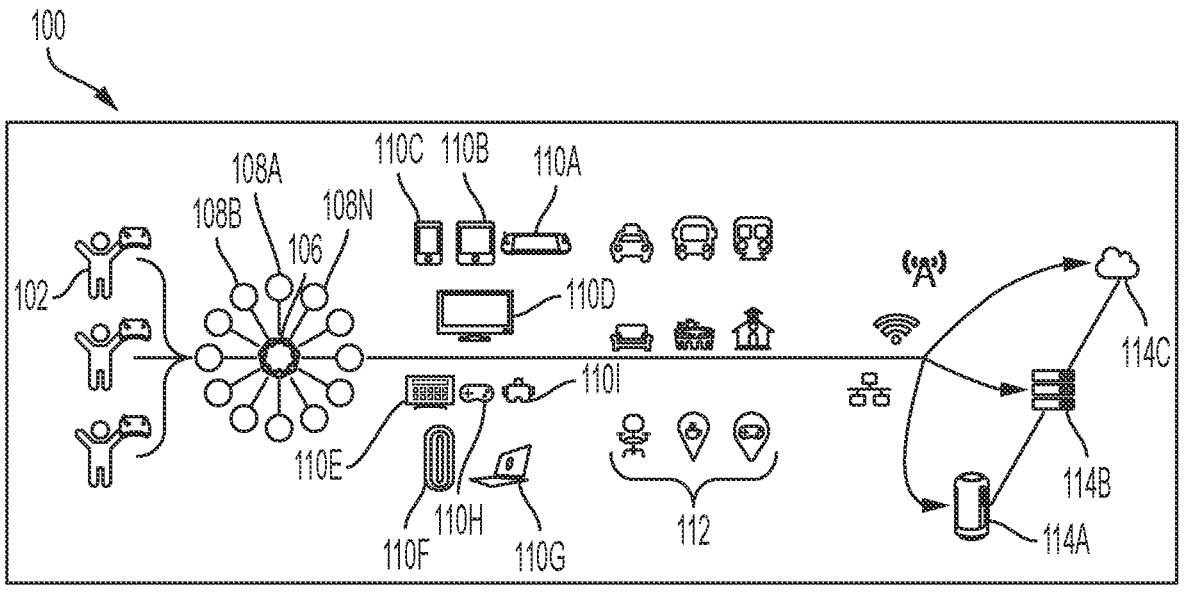
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

A user may interact with the service through a peripheral device, such as a wireless controller. The wireless controller may have status information that a user would desire to monitor. The status information could include a battery status, the controller's location, whether the controller is available for use, or a user profile associated with the controller. The wireless controller may not have a display screen, and so monitoring status information for the controller may be difficult. Status information for the controller may be transmitted to and displayed by an information handling system, such as a user's mobile device. Users may also have multiple controllers in a gaming environment (e.g., in different locations in a home), and may desire to monitor status information or control all of the controllers at the same time. Embodiments described herein may be applied by one or a combination of the wireless controller(s), the hub device, a user's mobile device, or other information handling systems. The embodiments provide techniques for transmitting and displaying status information for a wireless controller, displaying the status information, and allowing a user greater control over the controller.

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with periph- eral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of informa- tion, intelligence, or data for business, scientific, control, or other purposes. For example, an information handling sys- tem may be a personal computer (e.g., desktop or laptop), tablet computer, mobile device (e.g., personal digital assis- tant (PDA) or smart phone), server (e.g., blade server or rack server), a network storage device, or any other suitable device and may vary in size, shape, performance, function- ality, and price. The information handling system may include random access memory (RAM), one or more pro- cessing resources such as a central processing unit (CPU) or hardware or software control logic, ROM, and/or other types of nonvolatile memory. Additional components of the infor- mation handling system may include one or more disk drives, one or more network ports for communicating with external devices as well as various input and output (I/O) devices, such as a keyboard, a mouse, touchscreen and/or a video display. The information handling system may also include one or more buses operable to transmit communi- cations between the various hardware components.

FIG. 1 is a block diagram illustrating aspects of a con- figurable system for providing services to users according some embodiments of the disclosure. A system 100 includes users 102 who may have access to a shared library of applications 106 including applications 108A-108N. The users 102 may have separate libraries, with some overlap- ping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
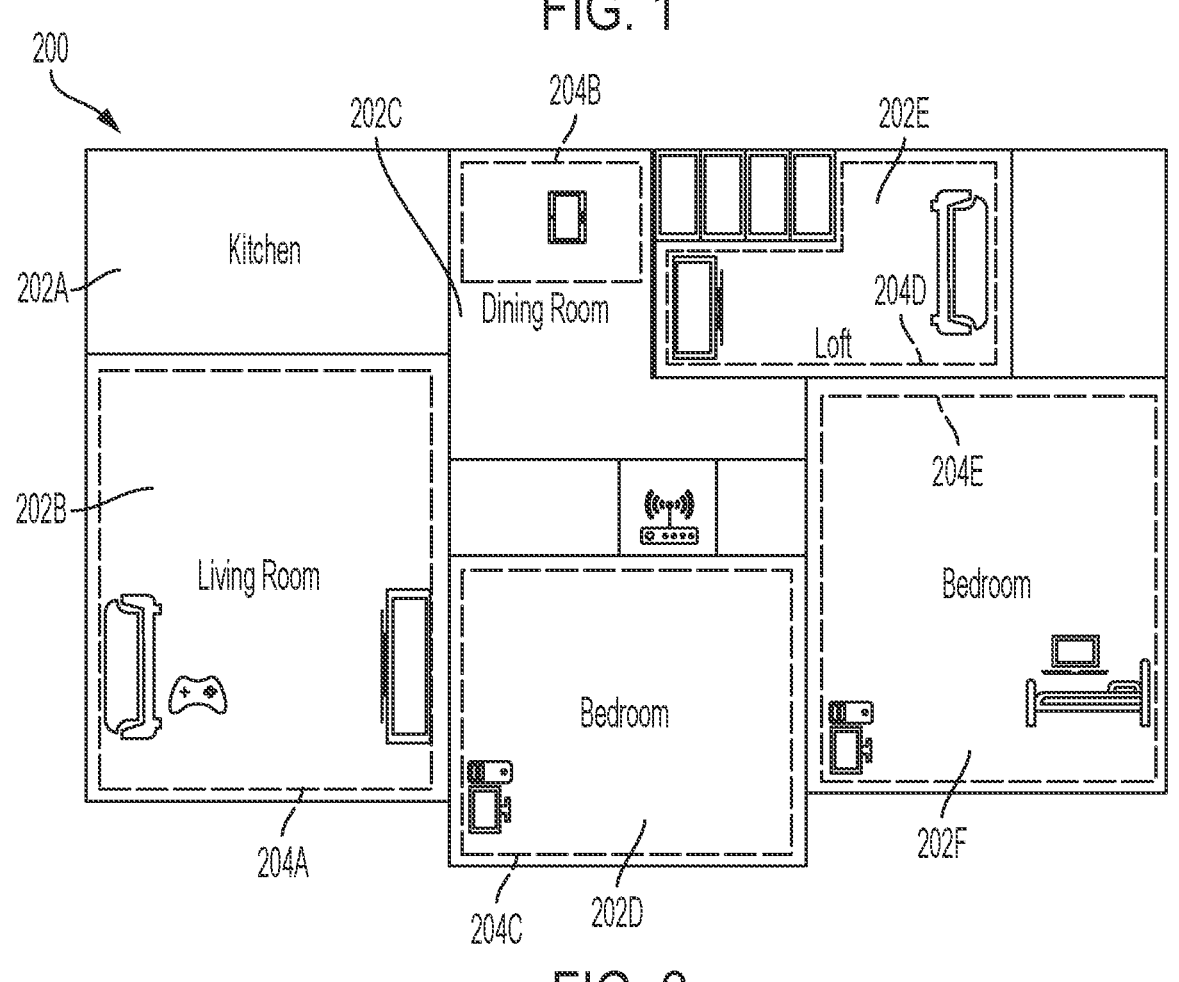
FIG. 2 is a block diagram illustrating possible game environments according to some embodiments of the disclosure.

FIG. 2 is a block diagram illustrating possible game environments according to some embodiments of the dis- closure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, mul- tiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transi- tion from an application hosted on a TV in living room 202B to an application hosted on TV in dining room 202C while remaining connected to a host service executing on a PC in bedroom 202D.

Figure 3A:
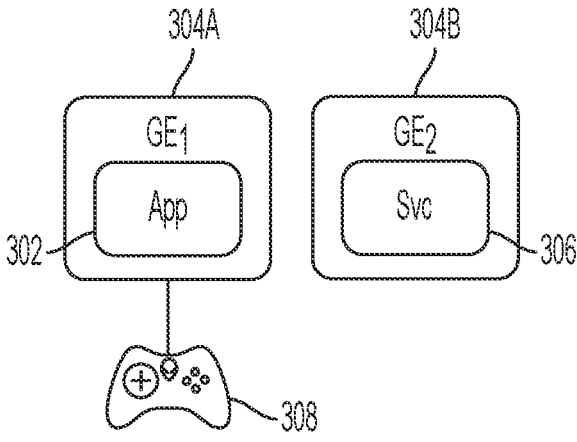
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The applica- tion 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
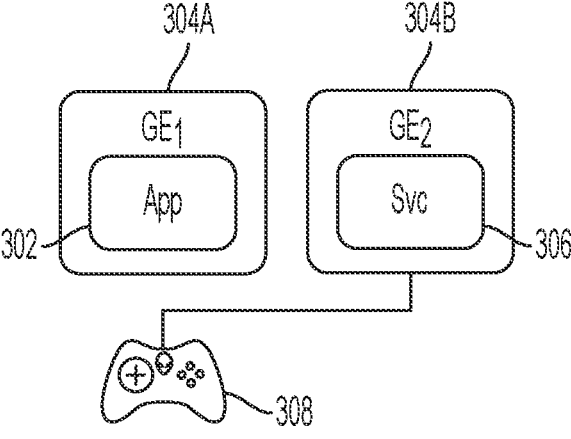
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environ- ments according to some embodiments of the disclosure. In FIG. 3B, the controller 308 communicates with the service 306 for providing user input to an application session, with the AV rendering target of the application session being application 302 in a different gaming environment.

Figure 3C:
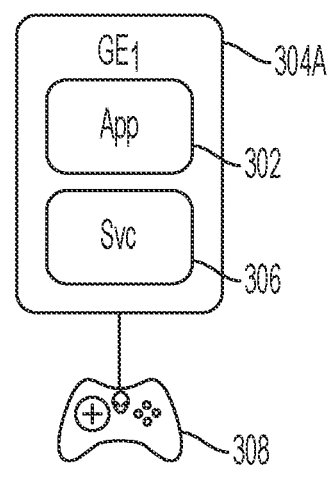
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming envi- ronment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the appli- cation 302.

Figure 3D:
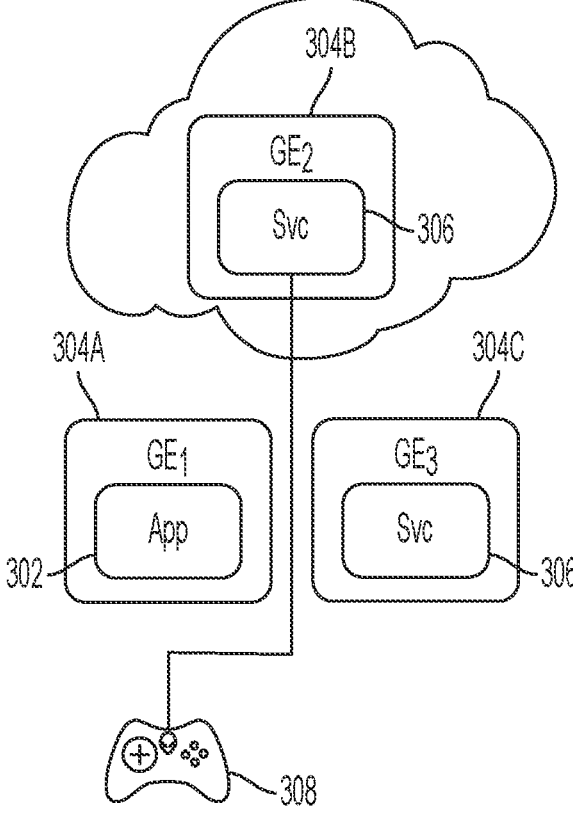
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environ- ment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a sub- scription service to the user.

Figure 4:
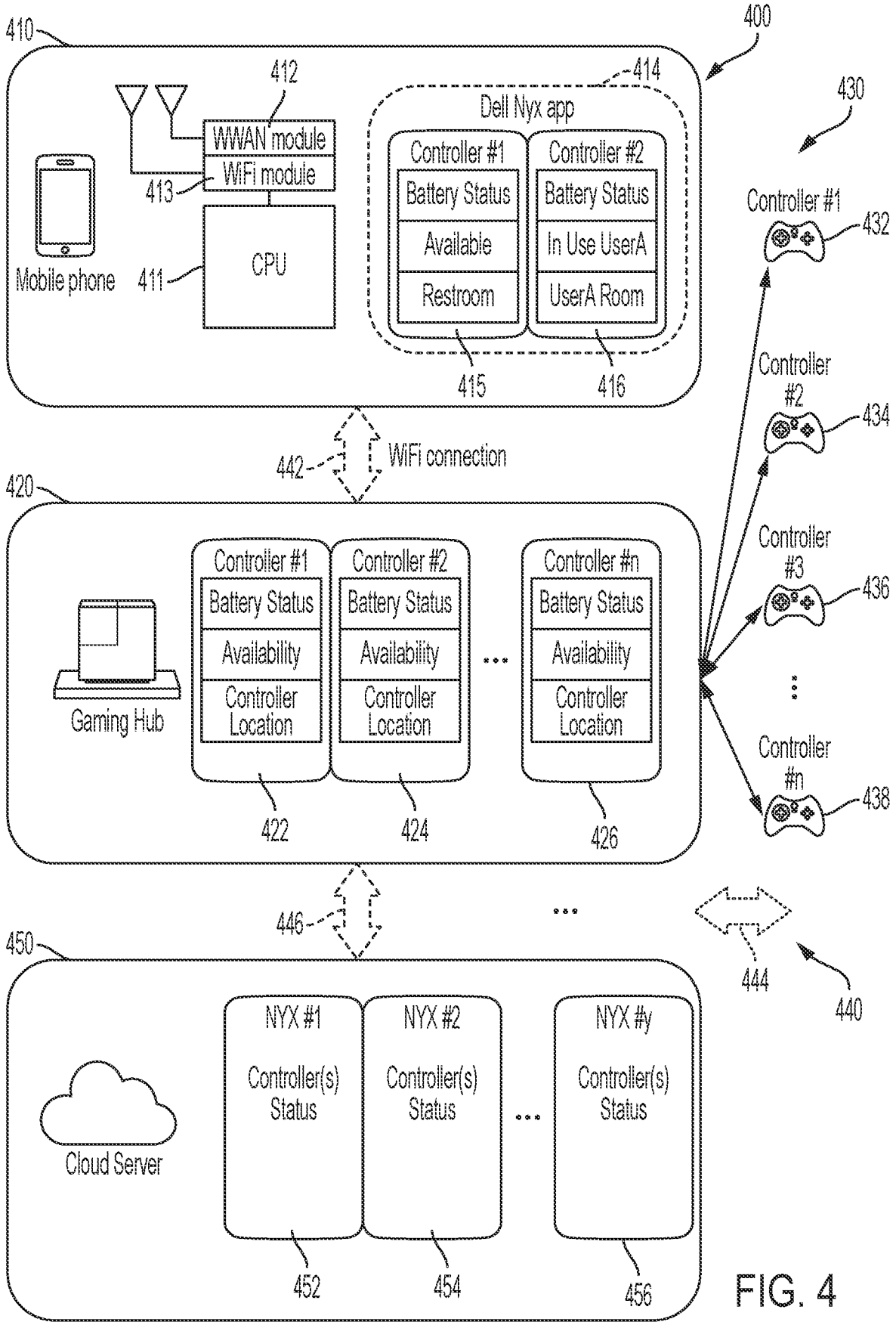
FIG. 4 is a block diagram illustrating a system for transmitting and displaying status information for gaming controllers according to some embodiments of the disclosure.

FIG. 4 shows a block diagram illustrating a system 400. System 400 may be configured to transmit, receive, display, and/or monitor status information for peripheral devices (e.g., gaming controllers). System 400 may include a mobile device 410, a gaming hub (e.g., a gaming server) 420, a gaming controller or plurality of gaming controllers 430, a plurality of wireless connections 440, and a cloud server 450 (e.g., a gaming cloud).

In some embodiments, a user may use a mobile device 410 to receive status information for at least one of the plurality of gaming controllers 430. Mobile device 410 may include hardware including a processor 411, a Wireless Wide Area Network (WWAN) module 412, and a WiFi module 413. WWAN module 412 and WiFi module 413 may each include (or share) antennas configured to receive signals from to their respective wireless networks. Mobile device 410 may also include an application 414 stored in memory that when executed by at least one processor (e.g., processor 411) causes the mobile device 410 to perform operations relating to the management of a fleet of gaming controllers.

Application 414 may be configured to receive status information (e.g., status information 415 or status information 416) for at least one of the plurality of gaming controllers 430. Application 414 may include a graphical user interface. Application 414 may be configured to display the status information of a gaming controller via the graphical user interface. The functionality of the mobile device 410 may also be performed by some other embodiment of an information handling system. The graphical user interface may also provide a map of the household or other dynamic gaming environment and location of controllers within the environment to allow the user to quickly locate lost controllers. The graphical user interface may also display whether a controller is currently in use and, if so, by what user and what service on the gaming hub the user is interacting with.

A user may also configure rules through the graphical user interface to apply to the status information. In some embodiments, a rule may specify that a notification is provided when one of the controllers in the fleet reaches a battery level below a threshold. The notification may be provided to the user of the information handling system and/or provided to another user, such as the user associated with the gaming controller. In some embodiments, a rule may specify that a notification is provided when one of the controllers in the fleet leaves a geographic boundary.

System 400 may include a gaming hub 420. Gaming hub 420 may include hub device functionality described above. Gaming hub 420 may receive status information for at least one of the plurality of gaming controllers 430 (e.g., status information 422 corresponding to gaming controller 432, status information 422 corresponding to a first gaming controller 432, or status information 424 corresponding to a second gaming controller 434, and/or status information 426 corresponding to an n-th gaming controller 438). Gaming hub 420 may be wirelessly connected to the mobile device 410 via a wireless connection 442. Gaming hub 420 may be wirelessly connected to the plurality of gaming controllers 430 via a wireless connection 444. Gaming hub 420 may be connected to a cloud server 450 via a wireless connection 446, although in each example of a wireless connection in FIG. 4 a wired connection may likewise be used.

The wireless connections 440 may include wireless connections 442, 444, and 446. The wireless connections 440 may facilitate communications between the various aspects of the system 400. For example, the wireless connections may be WiFi connections. In some implementations, some of the wireless connections may be configured for other wireless technologies (e.g., Bluetooth, WLAN, or Zigbee). Although FIG. 4 illustrates the wireless connections 440 as separate wireless connections, at least some of the wireless connections 440 may be formed through connections to the same wireless network.

Cloud server 450 may receive information from the gaming hub 420 regarding the status information of the gaming controllers 430 connected to the gaming hub 420. Updates to status information for the gaming controllers 430 may be transmitted to the cloud server 450 by the gaming hub 420. Cloud server may include information regarding multiple gaming hubs (e.g., gaming hub information 452, gaming hub information 454, and/or gaming hub information 456). Cloud server 450 may include databases for storing information.

Figure 5:
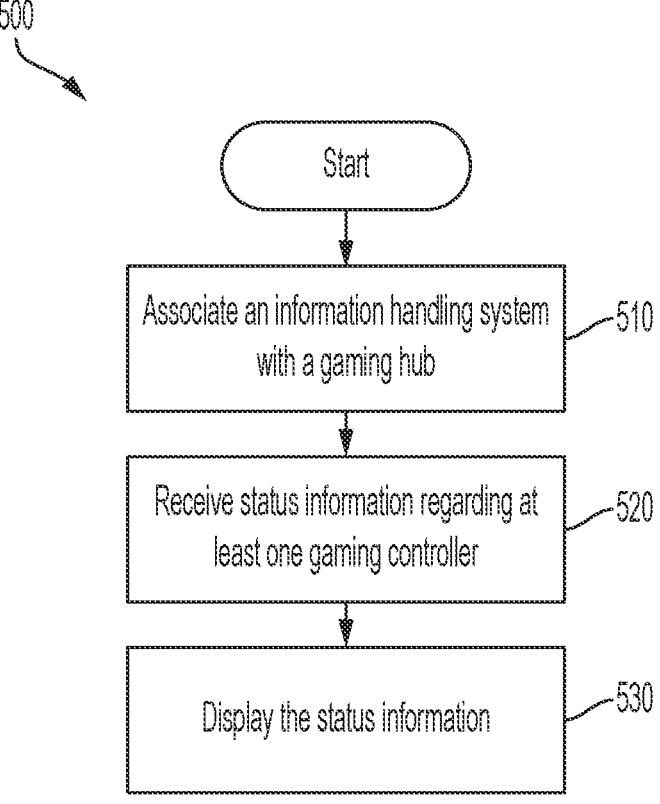
FIG. 5 is a flowchart illustrating a method of transmitting and displaying status information for gaming controllers according to some embodiments of the disclosure.

FIG. 5 is a flowchart illustrating a method of transmitting and displaying status information for gaming controllers according to some embodiments of the disclosure. Method 500, shown in FIG. 5, may include a series of operations which, when performed by an information handling system, may cause the information handling system to receive and display status information for at least one gaming controller.

Operation 510 includes the step of associating an information handling system with a gaming hub. Associating an information handling system with a gaming hub may include forming a wireless connection between the information handling system and the gaming hub. In some implementations, the information handling system may include a mobile device. In some implementations, the information handling system may be uniquely associated with the gaming hub.

Operation 520 includes the step of receiving by the information handling system status information regarding at least one gaming controller. The status information may include a battery status (e.g., a charge level, a percentage remaining, and/or an estimated time remaining), the controller's location, whether the controller is available for use, or a user profile associated with the controller. If the controller is in use, status information for the controller may identify the user using the controller. Status information may also include information relating to whether a user is planning to use a specific gaming controller (e.g., scheduling information) or whether a specific gaming controller is part of a fleet of gaming controllers. Status information may be received by a wireless connection between the controller, the information handling system, and/or the gaming hub. In some embodiments, status information may be received through a wireless connection to a cloud server.

Operation 530 includes the step of displaying, by the information handling system, the status information. For example, in some implementations, the information handling system may display the status information on a screen of a mobile device. Displaying the status information on a mobile device screen may include displaying the status information on a graphical user interface of an application. In some implementations, the information handling system may cause the status information to be displayed on a separate screen (e.g., a screen on which a gaming application may be displayed).

Additional steps may be performed as part of process 500. Some implementations include the operation of registering, by the information handling system, the at least one gaming controller with the gaming hub. Registering the gaming controller with the gaming hub may include connecting the gaming controller and the gaming hub to a wireless network and authenticating the gaming controller to the gaming hub such that the gaming controller may be used to access services provided by the gaming hub. In some embodiments, the information handling system (e.g., a mobile device) may include an application for connecting the information handling system to the gaming controller and to the gaming hub. Registration may include the process of connecting the gaming controller to the application. In some aspects, after registering the at least one gaming controller, the status information includes a status of the at least one controller. For example, registering the at least one gaming controller may enable access to status information on the information handling system that is designated for managing the fleet of controllers for the gaming hub. In some implementations, the status information for the gaming controller may not be available or visible until after the gaming controller is registered.

In some embodiments, registering the at least one gaming controller may include configuring, by the information handling system, a user profile for the at least one gaming controller and associating the user profile for the at least one gaming controller with the information handling system. Configuring the user profile may enable the information handling system to determine ownership of the gaming controller. Configuring the user profile may enable the information handling system to determine which user in a multi-user environment is using the gaming controller at a given time. Registering the at least one gaming controller may include providing user profile information to the information handling system. For example, user profile information may provide a name for the at least one gaming controller (e.g., "User 1's controller") or identify a home location for the controller (e.g., an environment). This user profile information may be transmitted as status information to the information handling system. The user profile may include information for customizing the gaming controller, such as assigning key combinations and shortcuts, assigning lighting colors, and/or configuring strength of rumble effects.

In some implementations, a user may be able to change at least some of the status information of a gaming controller. For example, the user may be able to add or remove a registration, a user profile, or scheduling information from the gaming hub, the information handling system, and/or the gaming controller. For example, this may be done using an application on the information handling system. In some implementations, a user may be able to remove a registration from one gaming hub and register the gaming controller with another gaming hub. For example, a user may bring their gaming controller to a friend's house and may connect their gaming controller to the friend's gaming hub. As a further example, a gaming controller may be registered to a second gaming hub as a guest, with no need to remove the registration from the first gaming hub. In some implementations adding or removing a registration may include updating the registration information on a cloud server.

In some implementations, the method 500 may be applied to a plurality of gaming controllers (e.g., a fleet of gaming controllers). The method may include receiving by the information handling system status information regarding a plurality of gaming controllers, and registering, by the information handling system, each gaming controller of the plurality of gaming controllers with the gaming hub. In some embodiments, displaying the status information includes displaying status information for each gaming controller of the plurality of gaming controllers. Each gaming controller may have its own status information. In addition to types of status information discussed above, the status information may include information about how each of the gaming controllers relate to each other. For example, if two or more of the gaming controllers are being used in the same location or to play in the same gaming application or gaming session, information on that status information may be received and/or displayed by the information handling system.

In some implementations, a user profile may be configured in an application on the information handling system and may be loaded onto a gaming controller of a plurality of gaming controllers (e.g., a household fleet). The user profile may be removed from the gaming controller and maintained in the application, so that the user profile may be later associated with a different gaming controller. The different gaming controller need not be part of the plurality of gaming controllers (e.g., it may be part of a different fleet of controllers or not part of a fleet of controllers at all).

In some implementations, receiving by the information handling system status information regarding at least one gaming controller further comprises receiving the status information from the gaming hub through a cloud server.

In some embodiments, the architecture described herein can work without the connection to a cloud server. The gaming hub, information handling system, and/or gaming controller(s) may still work together if, for example, there is limited internet accessibility, or a user chooses to disconnect aspects of the system from the internet. For example, a user may have concerns about releasing personal information to the public cloud.

In some implementations, status information regarding the location of a gaming controller may be determined based on a knowledge graph. In some implementations, the knowledge graph may correspond to a map of gaming environments in a user's household. For example, the knowledge graph may be configured similarly to the knowledge graphs discussed above (e.g., using telemetry data from the gaming controllers). The knowledge graph may include location information corresponding to gaming environments, such as the ones illustrated in FIG. 2. In some implementations, a method may include removing the at least one gaming controller from an environment in the household and maintaining a connection between at least one gaming controller and the information handling system. For example, if the user removes a gaming controller associated with their mobile device from a household gaming environment, the mobile device may still maintain a connection to the gaming controller.

Figure 6:
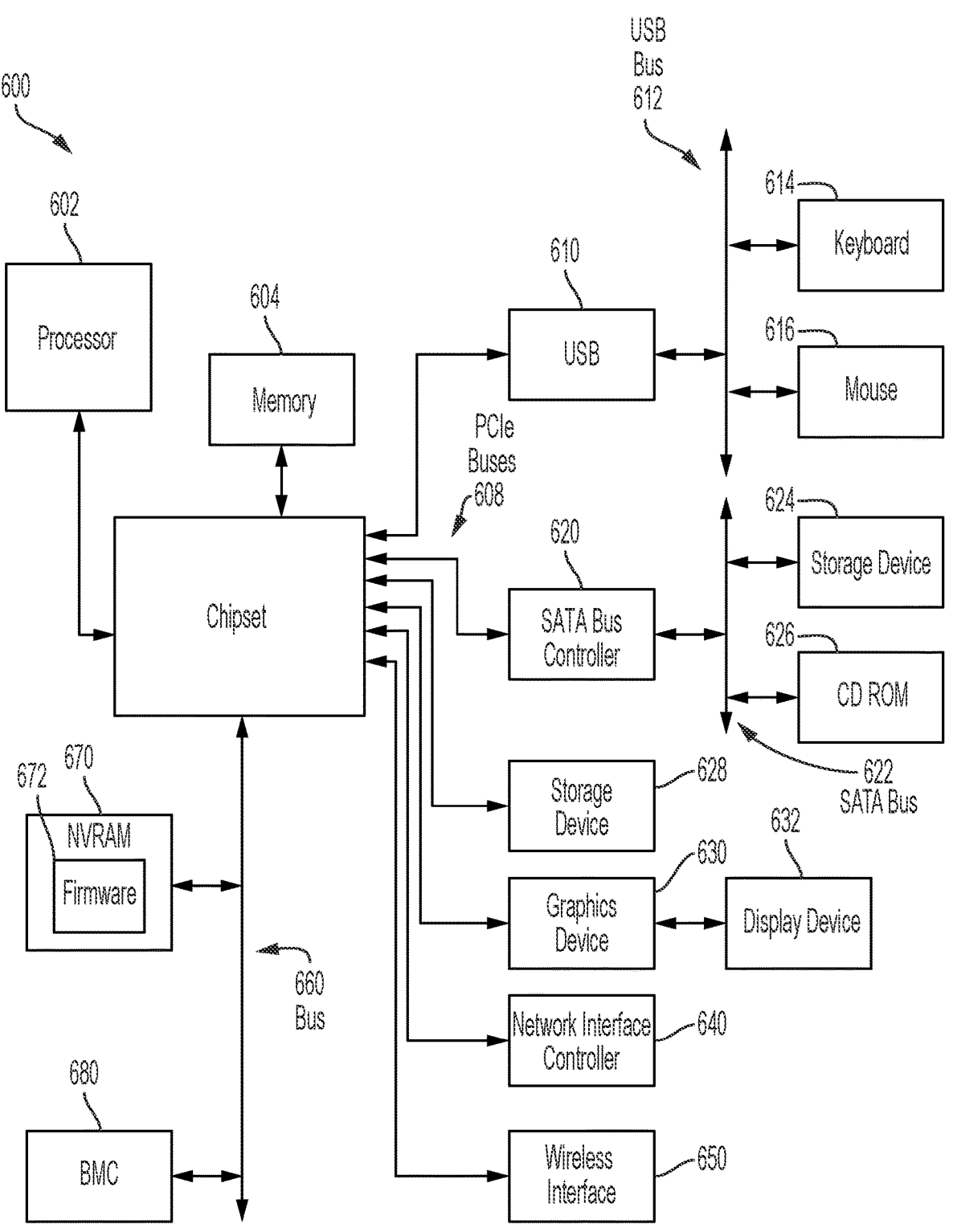
FIG. 6 is a schematic block diagram of an example information handling system according to some embodiments of the disclosure.

FIG. 6 illustrates an example information handling system 600. Information handling system 600 may include a processor 602 (e.g., a central processing unit (CPU)), a memory (e.g., a dynamic random-access memory (DRAM)) 604, and a chipset 606. In some embodiments, one or more of the processor 602, the memory 604, and the chipset 606 may be included on a motherboard (also referred to as a mainboard), which is a printed circuit board (PCB) with embedded conductors organized as transmission lines between the processor 602, the memory 604, the chipset 606, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 602, the memory 604, the chipset 606, and/or other components may be organized as a System on Chip (SoC).

The processor 602 may execute program code by accessing instructions loaded into memory 604 from a storage device, executing the instructions to operate on data also loaded into memory 604 from a storage device, and generate output data that is stored back into memory 604 or sent to another component. The processor 602 may include processing cores capable of implementing any of a variety of instruction set architectures (ISAs), such as the x86, POW-ERPC®, ARM®, SPARC®, or MIPS® ISAs, or any other suitable ISA. In multi-processor systems, each of the processors 602 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 606 may facilitate the transfer of data between the processor 602, the memory 604, and other components. In some embodiments, chipset 606 may include two or more integrated circuits (ICs), such as a northbridge controller coupled to the processor 602, the memory 604, and a southbridge controller, with the southbridge controller coupled to the other components such as USB 610, SATA 620, and PCIe buses 608. The chipset 606 may couple to other components through one or more PCIe buses 608.

Some components may be coupled to one bus line of the PCIe buses 608, whereas some components may be coupled to more than one bus line of the PCIe buses 608. One example component is a universal serial bus (USB) controller 610, which interfaces the chipset 606 to a USB bus 612. A USB bus 612 may couple input/output components such as a keyboard 614 and a mouse 616, but also other components such as USB flash drives, or another information handling system. Another example component is a SATA bus controller 620, which couples the chipset 606 to a SATA bus 622. The SATA bus 622 may facilitate efficient transfer of data between the chipset 606 and components coupled to the chipset 606 and a storage device 624 (e.g., a hard disk drive (HDD) or solid-state disk drive (SDD)) and/or a compact disc read-only memory (CD-ROM) 626. The PCIe bus 608 may also couple the chipset 606 directly to a storage device 628 (e.g., a solid-state disk drive (SDD)). A further example of an example component is a graphics device 630 (e.g., a graphics processing unit (GPU)) for generating output to a display device 632, a network interface controller (NIC) 640, and/or a wireless interface 650 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 606 may also be coupled to a serial peripheral interface (SPI) and/or Inter-Integrated Circuit (I2C) bus 660, which couples the chipset 606 to system management components. For example, a non-volatile random-access memory (NVRAM) 670 for storing firmware 672 may be coupled to the bus 660. As another example, a controller, such as a baseboard management controller (BMC) 680, may be coupled to the chipset 606 through the bus 660. BMC 680 may be referred to as a service processor or embedded controller (EC). Capabilities and functions provided by BMC 680 may vary considerably based on the type of information handling system. For example, the term baseboard management system may be used to describe an embedded processor included at a server, while an embedded controller may be found in a consumer-level device. As disclosed herein, BMC 680 represents a processing device different from processor 602, which provides various management functions for information handling system 600. For example, an embedded controller may be responsible for power management, cooling management, and the like. An embedded controller included at a data storage system may be referred to as a storage enclosure processor or a chassis processor.

System 600 may include additional processors that are configured to provide localized or specific control functions, such as a battery management controller. Bus 660 can include one or more busses, including a Serial Peripheral Interface (SPI) bus, an Inter-Integrated Circuit (I2C) bus, a system management bus (SMBUS), a power management bus (PMBUS), or the like. BMC 680 may be configured to provide out-of-band access to devices at information handling system 600. Out-of-band access in the context of the bus 660 may refer to operations performed prior to execution of firmware 672 by processor 602 to initialize operation of system 600.

Firmware 672 may include instructions executable by processor 102 to initialize and test the hardware components of system 600. For example, the instructions may cause the processor 602 to execute a power-on self-test (POST). The instructions may further cause the processor 602 to load a boot loader or an operating system (OS) from a mass storage device. Firmware 672 additionally may provide an abstraction layer for the hardware, such as a consistent way for application programs and operating systems to interact with the keyboard, display, and other input/output devices. When power is first applied to information handling system 600, the system may begin a sequence of initialization procedures, such as a boot procedure or a secure boot procedure. During the initialization sequence, also referred to as a boot sequence, components of system 600 may be configured and enabled for operation and device drivers may be installed. Device drivers may provide an interface through which other components of the system 600 can communicate with a corresponding device. The firmware 672 may include a basic input-output system (BIOS) and/or include a unified extensible firmware interface (UEFI). Firmware 672 may also include one or more firmware modules of the information handling system. Additionally, configuration settings for the firmware 672 and firmware of the information handling system 600 may be stored in the NVRAM 670. NVRAM 670 may, for example, be a non-volatile firmware memory of the information handling system 600.

Information handling system 600 may include additional components and additional busses, not shown for clarity. For example, system 600 may include multiple processor cores (either within processor 602 or separately coupled to the chipset 606 or through the PCIe buses 608), audio devices (such as may be coupled to the chipset 606 through one of the PCIe busses 608), or the like. While a particular arrangement of bus technologies and interconnections is illustrated for the purpose of example, one of skill will appreciate that the techniques disclosed herein are applicable to other system architectures. System 600 may include multiple processors and/or redundant bus controllers. In some embodiments, one or more components may be integrated together in an integrated circuit (IC), which is circuitry built on a common substrate. For example, portions of chipset 606 can be integrated within processor 602. Additional components of information handling system 600 may include one or more storage devices that may store machine-executable code, one or more communications ports for communicating with external devices, and various input and output (I/O) devices, such as a keyboard, a mouse, and a video display.

In some embodiments, processor 602 may include multiple processors, such as multiple processing cores for parallel processing by the information handling system 600. For example, the information handling system 600 may include a server comprising multiple processors for parallel processing. In some embodiments, the information handling system 600 may support virtual machine (VM) operation, with multiple virtualized instances of one or more operating systems executed in parallel by the information handling system 600. For example, resources, such as processors or processing cores of the information handling system may be assigned to multiple containerized instances of one or more operating systems of the information handling system 600 executed in parallel. A container may, for example, be a virtual machine executed by the information handling system 600 for execution of an instance of an operating system by the information handling system 600. Thus, for example, multiple users may remotely connect to the information handling system 600, such as in a cloud computing configuration, to utilize resources of the information handling system 600, such as memory, processors, and other hardware, firmware, and software capabilities of the information handling system 600. Parallel execution of multiple containers by the information handling system 600 may allow the information handling system 600 to execute tasks for multiple users in parallel secure virtual environments.

The flow chart diagram of FIG. 5 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

associating, by an information handling system, with a gaming hub;

receiving, by the information handling system, status information regarding at least one gaming controller, the status information comprising at least a user profile associated with the at least one gaming controller, a battery charge status, and a location, wherein the location is determined based on a knowledge graph, wherein the knowledge graph corresponds to environments in a household of the gaming hub; and displaying, by the information handling system, the status information on a graphical user interface comprising a map of the environments showing the location of the at least one gaming controller.

2. The method of claim 1, further comprising:

registering, by the information handling system, the at least one gaming controller with the gaming hub;

wherein after registering the at least one gaming controller, the status information includes a status of the at least one controller.

3. The method of claim 2, wherein registering the at least one gaming controller comprises:

configuring, by the information handling system, a user profile for the at least one gaming controller; and associating the user profile for the at least one gaming controller with the information handling system.

4. The method of claim 2, further comprising:

receiving by the information handling system status information regarding a plurality of gaming controllers; and registering, by the information handling system, each gaming controller of the plurality of gaming controllers with the gaming hub;

wherein displaying, by the information handling system, the status information comprises displaying status information for each gaming controller of the plurality of gaming controllers.

5. The method of claim 1, wherein receiving by the information handling system status information regarding at least one gaming controller further comprises receiving the status information from the gaming hub through a cloud server.

6. The method of claim 1, further comprising:

removing the at least one gaming controller from the environment in the household; and maintaining a connection between the at least one gaming controller and the information handling system.

7. An information handling system, comprising:

a memory;

a processor coupled to the memory, wherein the processor is configured to perform steps comprising:

associating the information handling system with a gaming hub;

receiving by the information handling system status information regarding at least one gaming controller, the status information comprising at least a user profile associated with the at least one gaming controller, a battery charge status, and a location, wherein the location is determined based on a knowledge graph, wherein the knowledge graph corresponds to environments in a household of the gaming hub; and displaying, by the information handling system, the status information on a graphical user interface comprising a map of the environments showing the location of the at least one gaming controller.

8. The information handling system of claim 7, further comprising:

registering, by the information handling system, the at least one gaming controller with the gaming hub;

wherein after registering the at least one gaming controller, the status information includes a status of the at least one controller.

9. The information handling system of claim 8, wherein registering the at least one gaming controller comprises:

configuring, by the information handling system, a user profile for the at least one gaming controller; and associating the user profile for the at least one gaming controller with the information handling system.

10. The information handling system of claim 8, further comprising:

receiving by the information handling system status information regarding a plurality of gaming controllers; and registering, by the information handling system, each gaming controller of the plurality of gaming controllers with the gaming hub;

wherein displaying, by the information handling system, the status information comprises displaying status information for each gaming controller of the plurality of gaming controllers.

11. The information handling system of claim 7, wherein receiving by the information handling system status information regarding at least one gaming controller further comprises receiving the status information from the gaming hub through a cloud server.

12. The information handling system of claim 7, further comprising:

removing the at least one gaming controller from an environment in the household; and maintaining a connection between the at least one gaming controller and the information handling system.

13. A computer program product, comprising:

a non-transitory computer readable medium comprising code for performing steps comprising:

associating an information handling system with a gaming hub;

receiving by the information handling system status information regarding at least one gaming controller, the status information comprising at least a user profile associated with the at least one gaming controller, a battery charge status, and a location, wherein the location is determined based on a knowledge graph, wherein the knowledge graph corresponds to environments in a household of the gaming hub; and displaying, by the information handling system, the status information on a graphical user interface comprising a map of the environments showing the location of the at least one gaming controller.

14. The computer program product of claim 13, further comprising:

registering, by the information handling system, the at least one gaming controller with the gaming hub;

wherein after registering the at least one gaming controller, the status information includes a status of the at least one controller.

15. The computer program product of claim 14, wherein registering the at least one gaming controller comprises:

configuring, by the information handling system, a user profile for the at least one gaming controller; and associating the user profile for the at least one gaming controller with the information handling system.

16. The computer program product of claim 14, further comprising:

receiving by the information handling system status information regarding a plurality of gaming controllers; and registering, by the information handling system, each gaming controller of the plurality of gaming controllers with the gaming hub;

wherein displaying, by the information handling system, the status information comprises displaying status information for each gaming controller of the plurality of gaming controllers.

17. The computer program product of claim 13, wherein receiving by the information handling system status information regarding at least one gaming controller further comprises receiving the status information from the gaming hub through a cloud server.

* * * * *